(12) United States Patent
Diosady et al.

(10) Patent No.: US 11,459,909 B2
(45) Date of Patent: Oct. 4, 2022

(54) ROTATING HEAT EXCHANGER

(71) Applicant: PRATT & WHITNEY CANADA CORP., Longueuil (CA)

(72) Inventors: Laslo Diosady, Etobicoke (CA); Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 74 days.

(21) Appl. No.: 17/021,547

(22) Filed: Sep. 15, 2020

(65) Prior Publication Data
US 2022/0082029 A1 Mar. 17, 2022

(51) Int. Cl.
| | | |
|---|---|---|
| *F01D 25/12* | (2006.01) | |
| *F02C 7/14* | (2006.01) | |
| *F28F 5/00* | (2006.01) | |

(52) U.S. Cl.
CPC .............. *F01D 25/125* (2013.01); *F02C 7/14* (2013.01); *F28F 5/00* (2013.01); *F28F 2215/06* (2013.01)

(58) Field of Classification Search
CPC ... F01D 25/125; F02C 7/14; F28F 5/00; F28F 2215/06; F28D 11/00; F28D 11/02; F28D 11/04
See application file for complete search history.

(56) References Cited

U.S. PATENT DOCUMENTS

| | | | | |
|---|---|---|---|---|
| 3,973,622 A | * | 8/1976 | Laing | F25B 3/00 165/86 |
| 3,978,660 A | * | 9/1976 | Laing | F02C 7/08 60/39.511 |
| 4,137,705 A | * | 2/1979 | Andersen | F28F 1/16 60/39.08 |
| 4,190,398 A | | 2/1980 | Corsmeier et al. | |
| 4,542,623 A | | 9/1985 | Hovan et al. | |
| 5,586,430 A | * | 12/1996 | Stopa | F02C 7/105 60/39.511 |
| 10,429,105 B1 | * | 10/2019 | Kariya | F28F 5/00 |
| 10,941,706 B2 | * | 3/2021 | Sen | F01K 25/103 |
| 2012/0128467 A1 | * | 5/2012 | Ruthemeyer | F02C 7/185 415/115 |
| 2013/0192252 A1 | | 8/2013 | Ackermann et al. | |
| 2020/0003463 A1 | * | 1/2020 | Kariya | F25B 30/02 |
| 2020/0256343 A1 | * | 8/2020 | Sakota | F01D 17/141 |
| 2020/0370503 A1 | * | 11/2020 | Notarnicola | B33Y 80/00 |
| 2020/0408107 A1 | * | 12/2020 | Foutch | F02C 7/18 |
| 2021/0095597 A1 | * | 4/2021 | Uhkoetter | F02C 7/14 |

\* cited by examiner

*Primary Examiner* — Craig Kim
(74) *Attorney, Agent, or Firm* — Norton Rose Fulbright Canada LLP

(57) ABSTRACT

The heat exchanger includes an inner casing extending circumferentially around the central axis and securable to the shaft for concurrent rotation therewith, and an outer casing extending circumferentially around the central axis and secured to the inner casing, the outer casing located radially outwardly of the inner casing relative to the central axis. First conduits are secured to the outer casing and to the inner casing for rotation about the central axis, the first conduits located radially between the outer casing and the inner casing, and circumferentially distributed about the central axis. First passages are defined in the first conduits. Second passages are circumferentially interspaced between the first passages and are located radially between the inner casing and the outer casing. The second passages are in heat exchange relationship with the first passages.

18 Claims, 5 Drawing Sheets

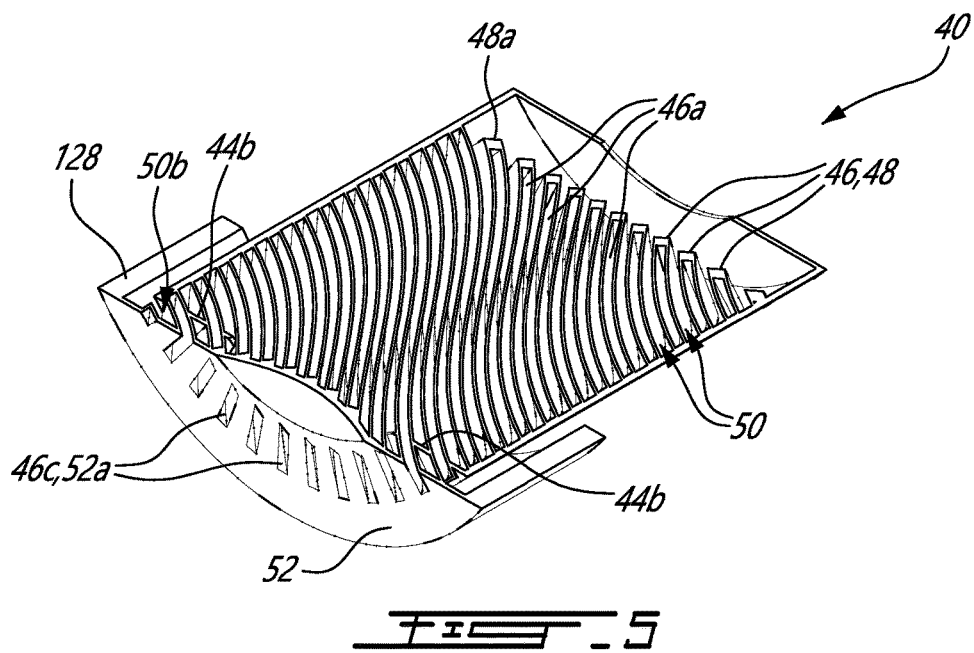
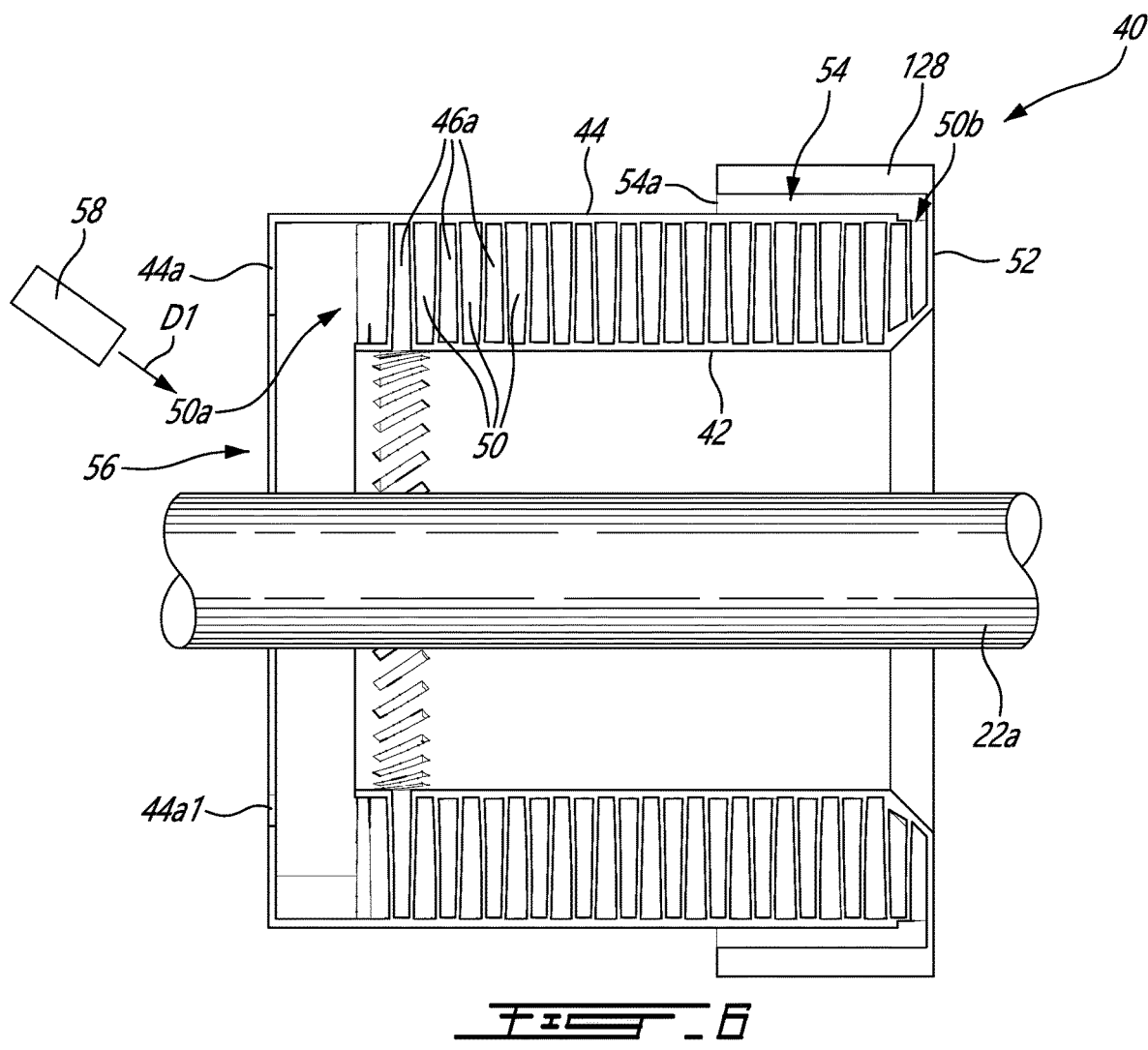

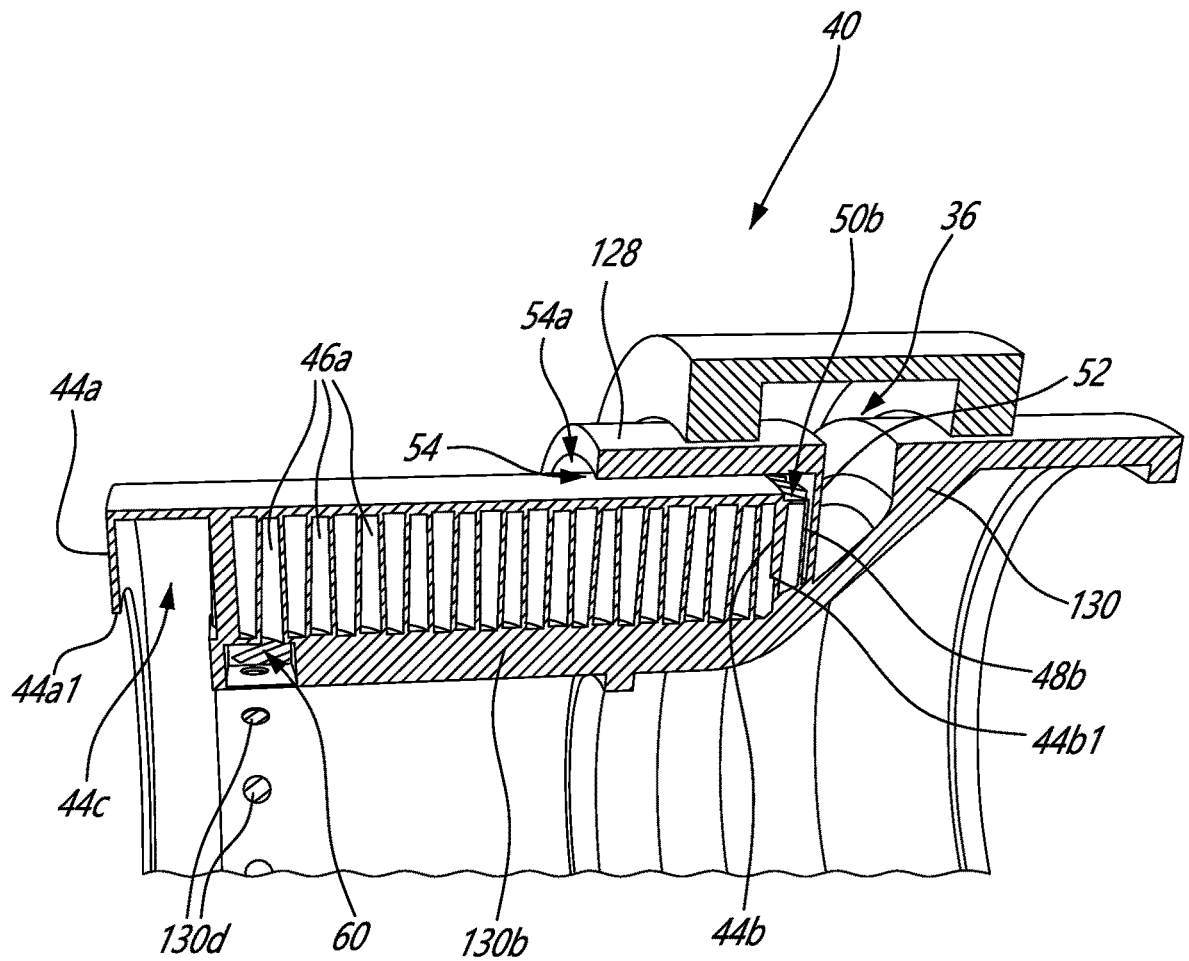

ROTATING HEAT EXCHANGER

TECHNICAL FIELD

The disclosure relates generally to gas turbine engines and, more particularly, to seals used in such engines and to systems and methods for sealing bearing cavities of such engines.

BACKGROUND

Gas turbine engines include one or more bearing housings defining bearing cavities that contain bearings. A bearing cavity is typically supplied with lubricating oil for lubricating the bearings it contains. To maintain the oil within the bearing cavity, a number of different types of seals may be used. One such seal may be secured to the bearing housing and sealingly engage seal runners rotatable with a shaft of the gas turbine engine. Each of the seals may include two seal members spaced apart from one another to define a buffer cavity. Compressed air is injected into the buffer cavity to increase an air pressure in the buffer cavity beyond that into the bearing cavity. In some cases, the compressed air may be too hot and may damage components downstream of the buffer cavity.

SUMMARY

In one aspect, there is provided a heat exchanger for a gas turbine engine having a shaft rotatable about a central axis, comprising: an inner casing extending circumferentially around the central axis and securable to the shaft for concurrent rotation therewith; an outer casing extending circumferentially around the central axis and secured to the inner casing, the outer casing located radially outwardly of the inner casing relative to the central axis; first conduits secured to the outer casing and to the inner casing for rotation about the central axis, the first conduits located radially between the outer casing and the inner casing, the first conduits circumferentially distributed about the central axis, first passages defined in the first conduits, the first passages extending from first inlets to first outlets; and second passages circumferentially interspaced between the first passages and located radially between the inner casing and the outer casing, the second passages extending from second inlets to second outlets, the second passages in heat exchange relationship with the first passages.

In some embodiments, the first fluid conduits are hollow fins circumferentially distributed about the central axis and extending radially from the inner casing to the outer casing, the air passages defined within the fins.

In some embodiments, the first inlets are circumferentially-distributed apertures defined though the inner casing.

In some embodiments, each of the fins extend from a leading edge to a trailing edge, the leading edge of each of the fins circumferentially offset from the trailing edge relative to the central axis such that the fins wrap around the inner casing.

In some embodiments, the outer casing defines a first flange proximate the second inlets and a second flange proximate the second outlets, each of the first flange and the second flange protruding from a respective one of axial ends of the outer casing toward the central axis to define an annular pool extending circumferentially all around the central axis, the first conduits located partially within the annular pool.

In some embodiments, a distal end of the first flange is located closer to the central axis than a distal end of the second flange, the second outlets defined radially between the distal end of the second flange and the inner casing and circumferentially between each two adjacent ones of the first conduits.

In some embodiments, a seal runner is secured to the inner casing, the seal runner located radially outwardly of the outer casing and radially spaced from the outer casing to define an annular outlet passage, the annular outlet passage fluidly communicating with the second outlets.

In some embodiments, the seal runner is secured to the inner casing via an annular flange extending radially from the inner casing to the seal runner.

In some embodiments, the annular flange defines circumferentially spaced-apart apertures, the circumferentially spaced-apart apertures corresponding to the first outlets.

In some embodiments, the second inlets are in fluid communication with a radial annular gap defined radially between the shaft and a distal end of the first annular flange, the radial annular gap sized to receive an oil jet from an oil nozzle.

In another aspect, there is provided a gas turbine engine comprising: a shaft rotatable about a central axis; a bearing housing extending circumferentially about the central axis and defining a bearing cavity, the shaft extending through the bearing housing within the bearing cavity; a seal secured to the bearing housing and sealingly engaging a seal runner rotatable about the central axis and secured to the shaft, the seal having two seal members spaced apart from one another to define a buffer cavity between the two seal members; and a heat exchanger located inside the bearing cavity, the heat exchanger secured to the shaft and rotating with the shaft about the central axis, the heat exchanger having air passages circumferentially distributed about the central axis, the air passages having air inlets fluidly communicating with a compressor section of the gas turbine engine and air outlets fluidly connected to the buffer cavity, oil passages circumferentially distributed about the central axis and interspaced between the air passages, the oil passages having oil inlets fluidly communicating with a source of lubricant and oil outlets fluidly connected to the bearing cavity of the bearing housing, the oil passages in heat exchange relationship with the air passages.

In some embodiments, the air inlets are fluidly communicating with the compressor section via an air conduit defined within the shaft.

In some embodiments, the air passages are defined by fins circumferentially distributed about the central axis and extending radially from an inner casing to an outer casing of the heat exchanger, each of the oil passages defined between two adjacent ones of the fins.

In some embodiments, each of the fins extend from a leading edge to a trailing edge, the leading edge of each of the fins circumferentially offset from the trailing edge relative to the central axis such that the fins wrap around the inner casing.

In some embodiments, the outer casing defines a first flange proximate the oil inlets and a second flange proximate the oil outlets, each of the first flange and the second flange protruding from a respective one of axial ends of the outer casing toward the central axis to define an annular pool extending circumferentially all around the central axis, the fins located within the annular pool.

In some embodiments, a distal end of the first flange is located closer to the central axis than a distal end of the second flange, the oil inlets communicating with an annular gap extending radially between the shaft and the distal end of the first flange, the oil outlets defined radially between the distal end of the second flange and the inner casing and circumferentially between each two adjacent ones of the fins.

In some embodiments, a second seal runner is secured to the inner casing, the second seal runner located radially outwardly of the outer casing and radially spaced from the outer casing to define an annular outlet passage, the annular outlet passage fluidly communicating with the oil outlets and with the bearing cavity, each of the seal runner and the second seal runner sealingly engaged to a respective one of the two seal members.

In some embodiments, the second seal runner is secured to the inner casing via an annular flange extending radially from the inner casing to the second seal runner.

In some embodiments, the annular flange defines circumferentially spaced-apart apertures, the circumferentially spaced-apart apertures corresponding to the air outlets communicating with the buffer cavity.

In accordance with an alternate aspect, there is also provided a method of cooling sealing air to be injected in a buffer cavity located between two seal members sealingly engaging a seal runner for separating a bearing cavity of a gas turbine engine from an environment outside the bearing cavity, the method comprising: flowing compressed air drawn from a compressor section of the gas turbine engine within air conduits; flowing oil within oil conduits in heat exchange relationship with the air conduits; and increasing a natural convection of the oil within the oil conduits by rotating the oil conduits and the air conduits about a central axis of the gas turbine engine.

In a particular embodiment, a shaft-mounted heat exchanger for a gas turbine engine is provided that uses the centrifuging action of the shaft to collect and circulate the existing engine oil to cool the secondary air prior to its injection into a buffering cavity. This may help to reduce temperature of shaft-seal interface and may increase the lifespan of the seals.

Accordingly, in a particular embodiment, a shaft-mounted heat exchanger is disclosed that uses the centrifuging action of the shaft to collect and circulate the existing engine oil, to thereby cool the secondary air prior to its injection into a buffering cavity. This may help to reduce the temperature of shaft-seal interfaces and help to increase the life of the seals.

BRIEF DESCRIPTION OF THE DRAWINGS

Reference is now made to the accompanying figures in which:

FIG. 5 is an off-centered three dimensional cutaway view of the heat exchanger of FIG. 3;

FIG. 6 is a centered cutaway view of the heat exchanger of FIG. 3; and

FIG. 7 is a centered three dimensional cutaway view of the heat exchanger of FIG. 3 shown installed on a seal runner of the engine of FIG. 1.

DETAILED DESCRIPTION

Figure 1:
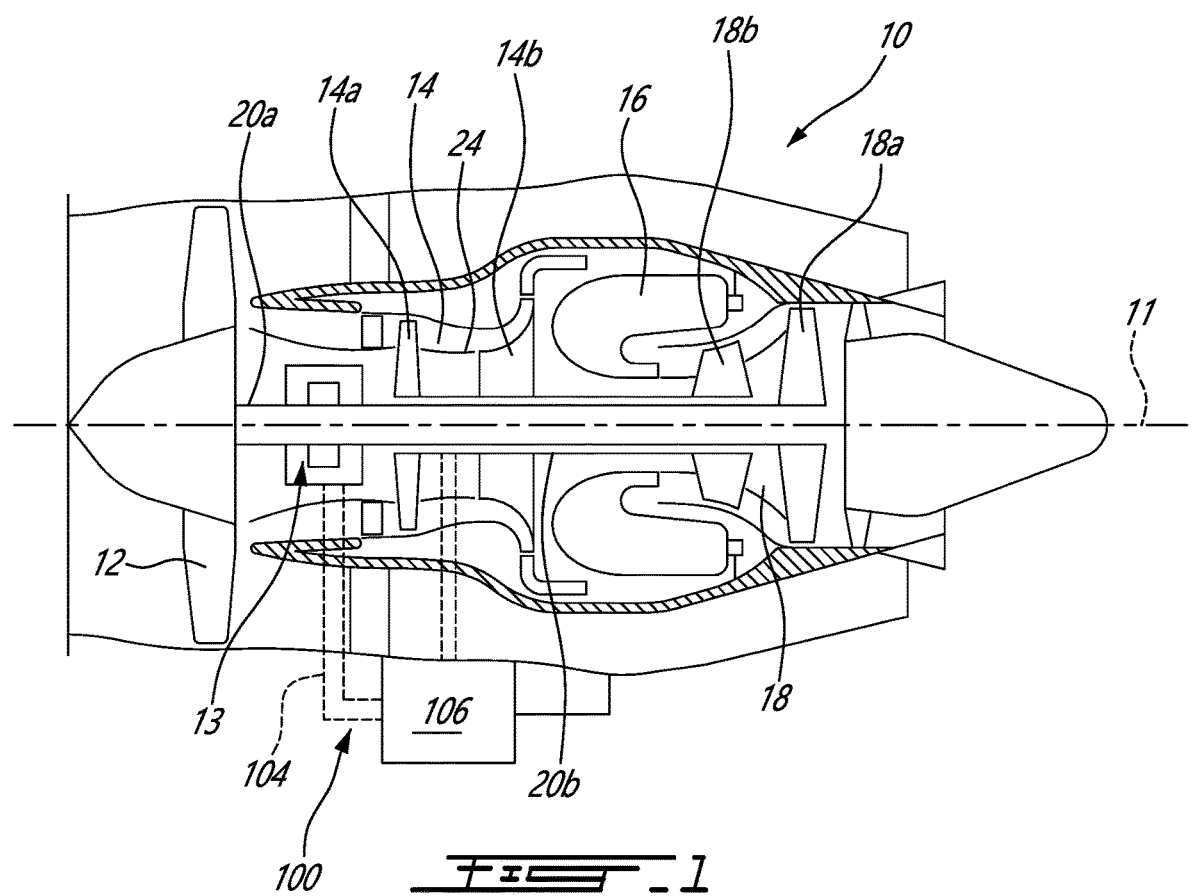
FIG. 1 is a schematic cross sectional view of a gas turbine engine.

FIG. 1 illustrates an aircraft engine 10, such as a gas turbine engine, of a type preferably provided for use in subsonic flight. The gas turbine engine 10 generally includes in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

In the depicted embodiment, the compressor section 14 includes an axial compressor 14a and a centrifugal compressor 14b downstream of the axial compressor 14a. The turbine section 18 includes a high-pressure turbine 18b and a low-pressure, or power, turbine 18a downstream of the high-pressure turbine 18b. The axial and centrifugal compressors 14a, 14b are drivingly engaged to the high-pressure turbine 18b via a high-pressure shaft 20b. The fan 12 is drivingly engaged to the low-pressure turbine 18a via a low-pressure shaft 20a extending concentrically through the high-pressure shaft 20b.

The gas turbine engine 10 includes a lubrication system 100 that includes a pump, lubrication conduits 104, a lubricant reservoir 106, and a de-aerator. The lubrication system 100 may also include additional components such as valve(s), heat exchanger 40s, filters, etc. The lubricant reservoir 106 is hydraulically connected to one or more components of the engine 10 in need of lubrication, such as, for instance, a bearing cavity 13, gearbox(es), and so on. The pump is operable to induce a flow of the lubricant from the lubricant reservoir 106, to the one or more components of the engine 10 in need of lubrication, and a scavenge pump is operable to draw a scavenge flow of oil back to the reservoir 106.

Figure 2:
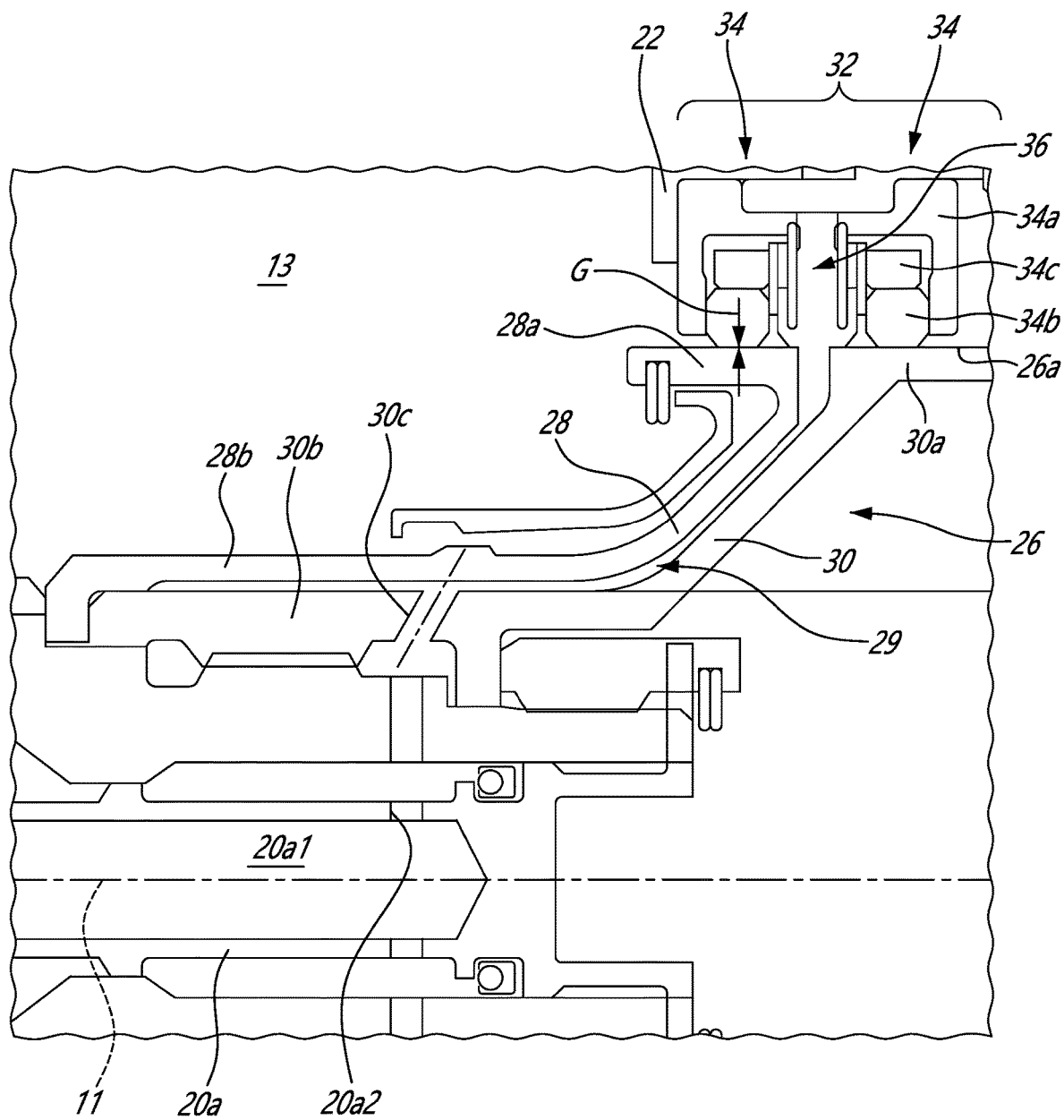
FIG. 2 is a cross-sectional view of a portion of the gas turbine engine of FIG. 1.

Referring to FIGS. 1-2, the bearing cavity 13 is defined by a bearing housing 22 (FIG. 2) that is secured to a casing 24 (FIG. 1) of the gas turbine engine 10. In use, compressed air is flown around the bearing cavity 13 to maintain a higher air pressure outside the bearing cavity 13 than within the bearing cavity 13 to limit lubricant from leaking out of the bearing cavity 13. The bearing housing 22 extends all around the central axis 11 and around the low-pressure shaft 20a. Seals are therefore required between the low-pressure shaft 20a and the bearing housing 22.

In the embodiment shown, a seal runner 26 is secured to the low-pressure shaft 20a for concurrent rotation with the low-pressure shaft 20a. The seal runner 26 defines a sealing face 26a that is sealingly engaged by a seal 32. In the embodiment shown, the seal runner 26 includes a first seal runner portion 28 and a second seal runner portion 30 and the seal 32 includes two seal members 34. Each of the first seal runner portion 28 and the second seal runner portion 30 is sealingly engaged to a respective one of the two seal members 34.

As shown in FIG. 2, each of the seal members 34 is a controlled gap seal including a seal housing 34a secured to the bearing housing 22, a sealing ring 34b within the seal housing 34a, and a retaining band 34c secured to the sealing ring 34b and encircling the sealing ring 34b. All of the seal housing 34a, the sealing ring 34b, and the retaining band 34c extends circumferentially all around the central axis 11. The retaining band 34c is used to control radial thermal expansion of the sealing ring 34b so that the radial thermal expansion of the sealing ring 34b matches that of the first seal runner portion 28 and of the second seal runner portion 30 to maintain a dimension of a controlled gap G between the sealing rings 34b and the sealing face 26a of the seal runner 26. More detail about such controlled gap seals are presented in U.S. patent application Ser. No. 16/589,588, the entire content of which are incorporated herein by reference.

Other kind of seals, such as contact seals (e.g., lip seal, carbon face seal, lift seal) may be used instead of controlled gap seals. The former may be simpler of installation but may require direct cooling and may have a shorter life span than the latter. The life span of the contact seals is affected by a rotational speed of the shaft, of the temperatures of the lubricant, and of a pressure within the bearing cavity 13. The controlled gap seal 32 may have an infinite life at unlimited shaft speeds. The controlled gap seals may achieve substantially zero leakage when installed in pairs as depicted in FIG. 2. A buffer cavity 36 is defined between the two seal members 34. Pressurized air, for instance from the compressor section 14, is flown into the buffer cavity 36. The pressurized air flown into the buffer cavity 36 is at a higher pressure than that in the bearing cavity 13.

As illustrated in FIG. 2, the low-pressure shaft 20a defines an inner passage 20a1 that is fluidly connected to the compressor section 14 and to the buffer cavity 36. Circumferentially distributed first apertures 20a2 through the low-pressure shaft 20a allow the compressed air to flow out of the inner passage 20a1 of the low-pressure shaft 20a towards the buffer cavity 36.

The first seal runner portion 28 defines a first seal section 28a and a first securing section 28b protruding from the first seal section 28a. The first seal section 28a is secured to the low-pressure shaft 20a via the first securing section 28b. Similarly, the second seal runner portion 30 defines a second seal section 30a and a second securing section 30b protruding from the second seal section 30a. The second seal section 30a is secured to the low-pressure shaft 20a via the second securing section 30b. In the embodiment shown, the first securing section 28b of the first seal runner portion 28 encircles the second securing section 30b of the second seal runner portion 30.

The second securing section 30b of the second seal runner portion 30 defines second apertures 30c circumferentially distributed around the central axis 11. The buffer cavity 36 between the two seal members 34 is fluidly connected to the compressor section 14 via an annular air passage 29 between the first securing section 28b and the second securing section 30b of the first seal runner portion 28 and the second seal runner portion 30, via the second apertures 30c defined through the securing section 30b of the second seal runner portion 30, via the first apertures 20a2 defined through the low-pressure shaft 20a, and via the inner passage 20a1 of the low-pressure shaft 20a.

It has been observed that, in certain operating conditions, the compressed air flown from the compressor section 14 to the buffer cavity 36 may be too hot and may be detrimental for a coupling used for drivingly engaging the low-pressure shaft 20a to a component (e.g., fan 12) driven by said shaft 20a. It will be appreciated that the above-described configuration may be applied to any shaft driving any component such as, for instance, a hydraulic pump, a generator, a permanent magnet alternator (PMA), etc. It may therefore be advantageous to cool the compressed air from the compressor section 14 before it reaches the buffer cavity 36. More specifically, the coupling may include elastomeric material which may be damaged when exposed temperatures above a given threshold.

Referring now to FIGS. 3-7, a heat exchanger in accordance with one embodiment is shown at 40. The heat exchanger 40 is used to transfer heat from the compressed air, which flows from the compressor section 14 to the buffer cavity 36, to lubricant that flows from a source of lubricant (e.g., lubricant reservoir 106) into the bearing cavity 13. The heat exchanger 40 is used to warm up the oil flowing therethrough while cooling the compressed air flowing therethrough.

The heat exchanger 40 includes an inner casing 42 secured to the low-pressure shaft 20a for concurrent rotation with the low-pressure shaft 20a, and an outer casing 44 secured to the inner casing 42 and radially spaced apart from the inner casing 42 relative to the central axis. Both of the inner casing 42 and the outer casing 44 extend circumferentially all around the central axis 11. The heat exchanger 40 defines first conduits, referred to herein below as air conduits 46. The air conduits 46 are circumferentially distributed around the central axis 11 and extend radially from the inner casing 42 to the outer casing 44 relative to the central axis 11. The air conduits 46 define air passages 46a (FIG. 6) in the air conduits 46. The air passages 46a extend from air inlets 46b (FIG. 3) fluidly connected to the compressor section 14 via the inner passage 20a1 of the low-pressure shaft 20a and air outlets 46c (FIG. 4) fluidly connected to the buffer cavity 36.

In the embodiment shown, the air conduits 46 are fins 48 that are hollow and that are circumferentially distributed around the central axis 11. The fins 48 are secured to both of the inner casing 42 and the outer casing 44. As shown more particularly in FIGS. 5 and 7, each of the fins 48 extend from a leading edge 48a to a trailing edge 48b that is axially offset from the leading edge 48a relative to the central axis 11. In the embodiment shown, the leading edge 48a of each of the fins 48 is circumferentially offset from the trailing edge 48b relative to the central axis 11 such that the fins 48 wrap around the inner casing 42. In other words, the fins 48 are helicoid. Having the fins 48 helicoid allows to increasing a length of the air passages 46a compared to a configuration in which the fins 48 are straight. Having fins 48 of a greater length may allow to increase the heat transfer of the heat of the compressed air to the oil. Alternatively, the fins 48 may be straight.

Figure 3:
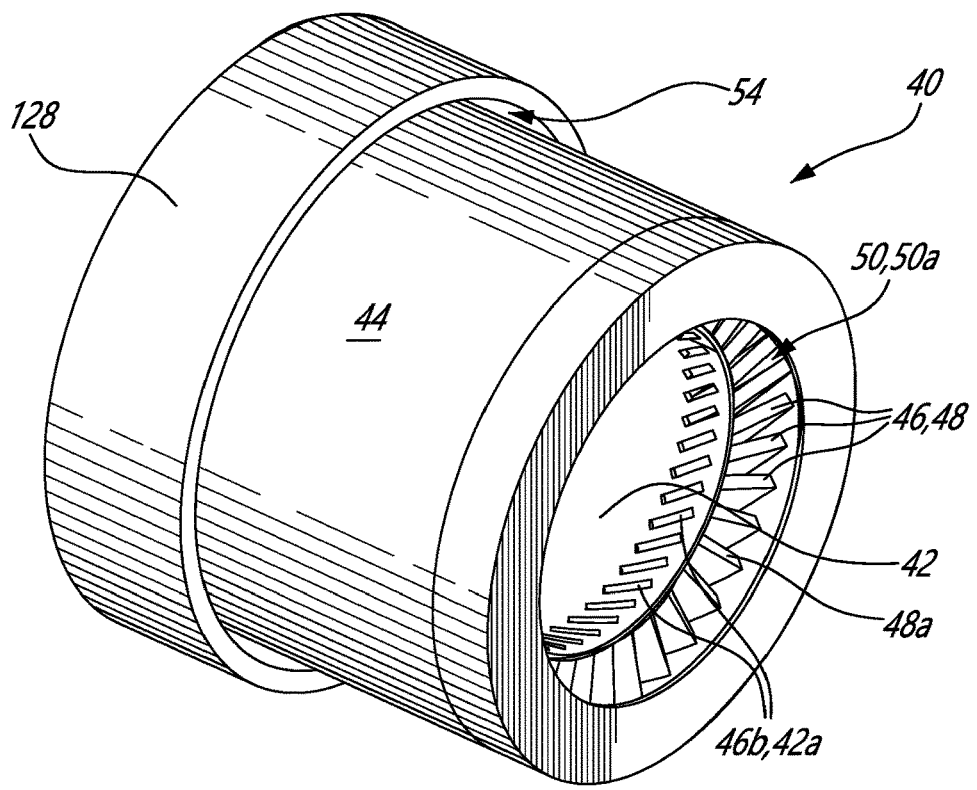
FIG. 3 is a three dimensional view of a heat exchanger securable to a shaft of the gas turbine engine of FIG. 1.

As shown in FIG. 3, the air inlets 46b are third apertures 42a circumferentially distributed around the central axis 11 and extending through the inner casing 42. Each of the third apertures 42a is in the present embodiment a rectangular-shaped slot that extends parallel to a respective one of the fins 48. Each of the third apertures 42a communicates with the inner passage 20a1 of the low-pressure shaft 20a and communicates with a respective one of the air passages 46a.

The heat exchanger 40 defines second passages, referred to below as oil passages 50. Each of the oil passages 50 is defined between two adjacent ones of the air conduits 46 and fins 48. The oil passages 50 are circumferentially interspaced between the air passages 46a and are located radially between the inner casing 42 and the outer casing 44 relative to the central axis 11. The oil passages 50 extend from oil inlets 50a (FIG. 3) to oil outlets 50b (FIG. 5). The oil inlets 50a are fluidly connected to the source of lubricant whereas the oil outlets 50b are fluidly connected to the bearing cavity 13. As shown, the oil inlets 50a are proximate the air inlets 46b. And, the oil outlets 50b are proximate the air outlets 46c. The heat exchanger 40 is therefore a parallel flow heat exchanger in which the air and the oil flow in the same direction. It will be appreciated that, alternatively, the heat exchanger 40 may be a counter flow heat exchanger in which the oil and the air flow in opposite directions instead of in the same direction.

In the embodiment shown, the heat exchanger 40 including the inner casing 42, the outer casing 44, the fins 48, and therefore the air passages 46a and the oil passages 50, rotate with the low-pressure shaft 20a about the central axis 11. The rotation of the heat exchanger 40 about the central axis 11 induces a centrifugal force to the oil flowing within the oil passages 50. The centrifugal force enhances natural convection. Natural convection is a phenomenon that occurs when differences in temperatures of a fluid induce movements of said fluid. In a room, the gravity induces these movements. For instance, warmer air in a room is less dense than colder air and moves toward the ceiling whereas the denser colder air migrates toward the floor. In the present case, the centrifugal force generated by the rotation of the heat exchanger 40 is such that convective forces within the oil passages 50 are comparable to a thermo-siphon of 22 meters in height when the heat exchanger 40 rotates at a rotational speed of about 7000 rpm. Friction forces are quite minimal because a radial height of the fins 48, which corresponds to the distance between the inner casing 42 and the outer casing 44, is about 1 inch in the depicted embodiment.

In use, the oil received within the oil passages 50 via the oil inlets 50a quickly moves toward the outer casing 44 because of the centrifugal force. A temperature of the oil increases between the oil inlets 50a and the oil outlets 50b because of the heat transferred from the air flowing within the air passages 46a. The heated oil is then forced toward the inner casing 42 before it exits the oil passages 50.

Referring more particularly to FIGS. 6-7, the outer casing 44 defines a first flange 44a proximate the oil inlets 50a and a second flange 44b proximate the oil outlets 50b. Each of the first flange 44a and the second flange 44b protrudes from a respective one of axial ends of the outer casing 44 toward the central axis 11. An annular pool 44c is defined radially inwardly of the outer casing 44 and axially from the first flange 44a to the second flange 44b. The annular pool 44c extends circumferentially all around the central axis 11. The air conduits 46, and the fins 48, are located at least partially within the annular pool 44c.

A first distal end 44a1 of the first flange 44a of the outer casing 44 is located closer to the central axis 11 than a second distal end 44b1 of the second flange 44b. This difference in radial distances between the first and second distal end 44a1, 44b1 and the central axis 11 allows the oil to exit the annular pool 44c by spilling over the second flange 44b. Thus, each of the oil outlets 50b of the oil passages 50 is defined radially between the second distal end 44b1 of the second flange 44b and the inner casing 42 and defined circumferentially between two adjacent ones of the fins 48.

Referring to FIGS. 3-4 and 6-7, the heat exchanger 40 defines a first seal runner portion 128 to replace the first seal runner portion 28 described above with reference to FIG. 2. More specifically, the heat exchanger 40 has an annular flange 52 extending circumferentially all around the central axis 11. The annular flange 52 extends radially outwardly from the inner casing 42 past the outer casing 44 and is secured to the first seal runner portion 128. The first seal runner portion 128 is located radially outwardly of the outer casing 44 and is radially spaced apart from the outer casing 44 to define an annular outlet passage 54. The annular outlet passage 54 communicates with the oil passages 50. The annular outlet passage 54 has an outlet end 54a (FIGS. 6-7) within the bearing cavity 13 via which the heated oil flows out of the annular outlet passage 54 into the bearing cavity 13.

Referring to FIG. 6, a radial annular gap 56 is defined radially between the first distal end 44a1 of the first flange 44a and the low-pressure shaft 20a. In use, the oil is injected into the annular pool 44c with a nozzle 58. More specifically, the nozzle 58 may be oriented toward the low-pressure shaft 20a at angle selected such that an oil jet flowing in direction D1 impinges the low-pressure shaft 20a and is deflected by the low-pressure shaft 20a and redirected radially outwardly toward the annular pool 44c. The oil is then divided circumferentially into the plurality of oil passages 50. Because of the centrifugal force created by the rotation of the outer casing 44, the oil remains within the annular pool 44c.

Figure 4:
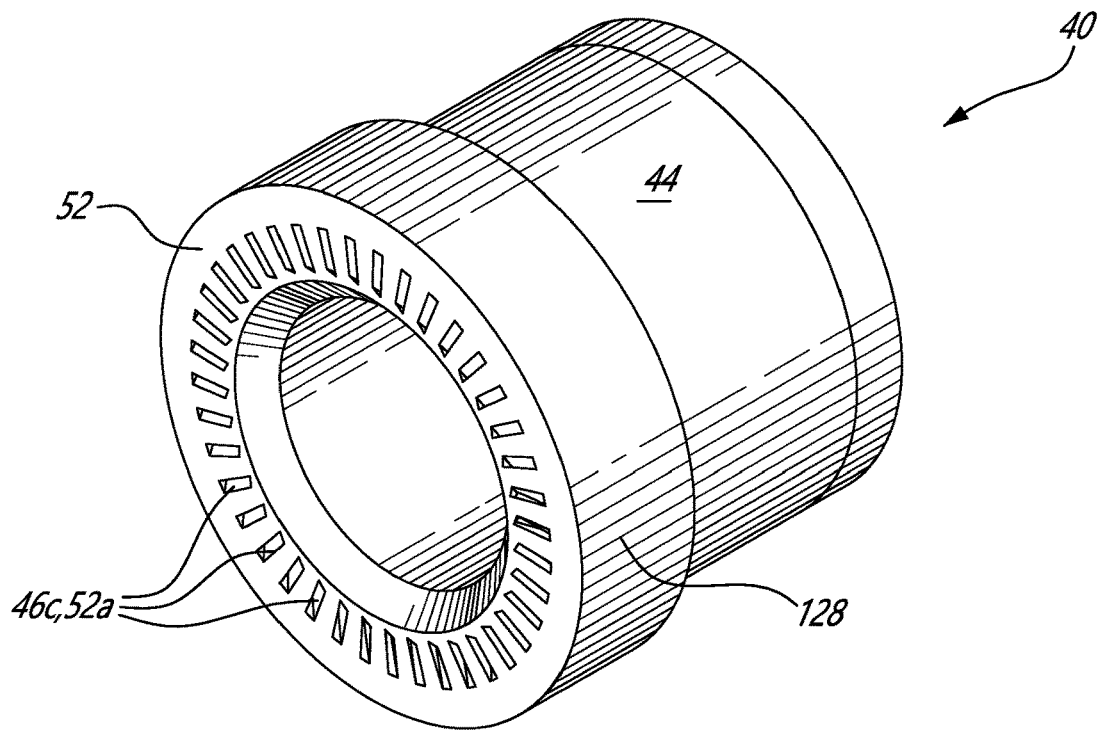
FIG. 4 is another three dimensional view of the heat exchanger of FIG. 3.

Referring more particularly to FIGS. 4 and 7, the annular flange 52 defines fourth apertures 52a circumferentially distributed around the central axis 11. Each of the fourth apertures 52a corresponds to a respective one of the air outlets 46c of the air passages 46a. The compressed air that has been cooled by flowing within the fins 48 and via the heat exchange relationship with the oil is flown into the buffer cavity 36 via the fourth apertures 52a.

As shown in FIG. 7, the second seal runner portion 130 defines fifth apertures 130d extending through the second securing section 130b of the second seal runner portion 130. The fifth apertures 130d communicates with the inner passage 20a1 of the low-pressure shaft 20a and with an annular plenum 60 circumferentially extending around the central axis 11 and located radially between the second securing section 130b and the inner casing 42. The annular plenum 60 circumferentially distributes the compressed air before it flows into the air passages 46a defined by the fins 48 and via the third apertures 42a defined though the inner casing 42. A number of the third apertures 42a may correspond to a number of the air inlets or be different than the number of the air inlets.

The disclosed heat exchanger 40 may require less oil than what a contact seal may require. The disclosed heat exchanger 40 may be used with a contact seal. Because of the enhanced oil natural convection created by the rotation of the heat exchanger 40, the heat exchanger 40 may be very compact. Cooling the air fed to the buffer cavity 36 may allow for a superior thermal control of the controlled gap carbon seal which may allow designing the seal with smaller gap thus lowering buffer air consumption consequently reducing the oil consumption. Cooling the air fed to the buffer cavity 36 may allow to increase a life span of the coupling downstream of the buffer cavity 36.

In the embodiment shown, the oil scavenged from the bearing cavity 13 is flown through a fuel-oil cooler via which the oil transfers its heat to fuel. The fuel exits the fuel-oil cooler and is then injected into the combustor 16. Therefore, a gain in efficiency may be achieved by heating the oil with the compressed air with the heat exchanger 40 since a temperature of the oil, and hence of the fuel injected in the combustor 16, is higher than a configuration lacking the heat exchanger 40. The higher temperature of the fuel may increase efficiency of a combustion process of the fuel into the combustor 16.

The heat exchanger 40 may be made by additive manufacturing (e.g., 3D printing). The heat exchanger 40 may be made of Titanium, Aluminum, Inconel™, or any other suitable material. In some cases, a thickness of components of the heat exchanger 40 (e.g., walls of the fins 48, inner casing 42, outer casing 44) is about 8 thousandth of an inch. With such a small thickness, a wide variety of materials may be used. Even if the selected material has a thermal conductivity less than that of Aluminum, there is still a suitable thermal conductivity therethrough because of this low thickness.

It will be appreciated that the heat exchanger 40 may be retrofitted on existing engines. For instance, with reference to FIG. 2, the first seal runner section 28 may be removed and replaced by the heat exchanger 40, which defines a seal runner 128.

The embodiments described in this document provide non-limiting examples of possible implementations of the present technology. Upon review of the present disclosure, a person of ordinary skill in the art will recognize that changes may be made to the embodiments described herein without departing from the scope of the present technology. The present disclosure may be used for cooling turbine air by fuel for a shaft fuel injection configuration. Yet further modifications could be implemented by a person of ordinary skill in the art in view of the present disclosure, which modifications would be within the scope of the present technology.

The invention claimed is:

1. A heat exchanger for a gas turbine engine having a shaft rotatable about a central axis, comprising:
   an inner casing extending circumferentially around the central axis and securable to the shaft for concurrent rotation therewith;
   an outer casing extending circumferentially around the central axis and secured to the inner casing, the outer casing located radially outwardly of the inner casing relative to the central axis;
   first conduits secured to the outer casing and to the inner casing for rotation about the central axis, the first conduits located radially between the outer casing and the inner casing, the first conduits circumferentially distributed about the central axis, first passages defined in the first conduits, the first passages extending from first inlets to first outlets, the first fluid conduits including hollow fins circumferentially distributed about the central axis and extending radially from the inner casing to the outer casing, the first passages defined within the fins, a fin of the fins extending from a leading edge to a trailing edge, the leading edge of the fin circumferentially offset from the trailing edge relative to the central axis such that the fin wraps around the inner casing; and
   second passages circumferentially interspaced between the first passages and located radially between the inner casing and the outer casing, the second passages extending from second inlets to second outlets, the second passages in heat exchange relationship with the first passages.

2. The heat exchanger of claim 1, wherein the first inlets are circumferentially-distributed apertures defined though the inner casing.

3. The heat exchanger of claim 1, wherein the outer casing defines a first flange proximate the second inlets and a second flange proximate the second outlets, each of the first flange and the second flange protruding from a respective one of axial ends of the outer casing toward the central axis to define an annular pool extending circumferentially all around the central axis, the first conduits located partially within the annular pool.

4. The heat exchanger of claim 3, wherein a distal end of the first flange is located closer to the central axis than a distal end of the second flange, the second outlets defined radially between the distal end of the second flange and the inner casing and circumferentially between each two adjacent ones of the first conduits.

5. The heat exchanger of claim 3, comprising a seal runner secured to the inner casing, the seal runner located radially outwardly of the outer casing and radially spaced from the outer casing to define an annular outlet passage, the annular outlet passage fluidly communicating with the second outlets.

6. The heat exchanger of claim 5, wherein the seal runner is secured to the inner casing via an annular flange extending radially from the inner casing to the seal runner.

7. The heat exchanger of claim 6, wherein the annular flange defines circumferentially spaced-apart apertures, the circumferentially spaced-apart apertures corresponding to the first outlets.

8. The heat exchanger of claim 3, wherein the second inlets are in fluid communication with a radial annular gap defined radially between the shaft and a distal end of the first annular flange, the radial annular gap sized to receive an oil jet from an oil nozzle.

9. A gas turbine engine comprising:
   a shaft rotatable about a central axis;
   a bearing housing extending circumferentially about the central axis and defining a bearing cavity, the shaft extending through the bearing housing within the bearing cavity;
   a seal secured to the bearing housing and sealingly engaging a seal runner rotatable about the central axis and secured to the shaft, the seal having two seal members spaced apart from one another to define a buffer cavity between the two seal members; and
   a heat exchanger located inside the bearing cavity, the heat exchanger secured to the shaft and rotating with the shaft about the central axis, the heat exchanger having
      air passages circumferentially distributed about the central axis, the air passages having air inlets fluidly communicating with a compressor section of the gas turbine engine and air outlets fluidly connected to the buffer cavity,
      oil passages circumferentially distributed about the central axis and interspaced between the air passages, the oil passages having oil inlets fluidly communicating with a source of lubricant and oil outlets fluidly connected to the bearing cavity of the bearing housing, the oil passages in heat exchange relationship with the air passages.

10. The gas turbine engine of claim 9, wherein the air inlets are fluidly communicating with the compressor section via an air conduit defined within the shaft.

11. The gas turbine engine of claim 9, wherein the air passages are defined by fins circumferentially distributed about the central axis and extending radially from an inner casing to an outer casing of the heat exchanger, each of the oil passages defined between two adjacent ones of the fins.

12. The gas turbine engine of claim 11, wherein each of the fins extend from a leading edge to a trailing edge, the leading edge of each of the fins circumferentially offset from the trailing edge relative to the central axis such that the fins wrap around the inner casing.

13. The gas turbine engine of claim 12, wherein the outer casing defines a first flange proximate the oil inlets and a second flange proximate the oil outlets, each of the first flange and the second flange protruding from a respective one of axial ends of the outer casing toward the central axis to define an annular pool extending circumferentially all around the central axis, the fins located within the annular pool.

14. The gas turbine engine of claim 13, wherein a distal end of the first flange is located closer to the central axis than a distal end of the second flange, the oil inlets communicating with an annular gap extending radially between the shaft and the distal end of the first flange, the oil outlets defined radially between the distal end of the second flange and the inner casing and circumferentially between each two adjacent ones of the fins.

15. The gas turbine engine of claim 14, comprising a second seal runner secured to the inner casing, the second seal runner located radially outwardly of the outer casing and radially spaced from the outer casing to define an annular outlet passage, the annular outlet passage fluidly communicating with the oil outlets and with the bearing cavity, each of the seal runner and the second seal runner sealingly engaged to a respective one of the two seal members.

16. The gas turbine engine of claim 15, wherein the second seal runner is secured to the inner casing via an annular flange extending radially from the inner casing to the second seal runner.

17. The gas turbine engine of claim 16, wherein the annular flange defines circumferentially spaced-apart apertures, the circumferentially spaced-apart apertures corresponding to the air outlets communicating with the buffer cavity.

18. A heat exchanger for a gas turbine engine having a shaft rotatable about a central axis, comprising:
   an inner casing extending circumferentially around the central axis and securable to the shaft for concurrent rotation therewith;
   an outer casing extending circumferentially around the central axis and secured to the inner casing, the outer casing located radially outwardly of the inner casing relative to the central axis;
   first conduits secured to the outer casing and to the inner casing for rotation about the central axis, the first conduits located radially between the outer casing and the inner casing, the first conduits circumferentially distributed about the central axis, first passages defined in the first conduits, the first passages extending from first inlets to first outlets; and
   second passages circumferentially interspaced between the first passages and located radially between the inner casing and the outer casing, the second passages extending from second inlets to second outlets, the second passages in heat exchange relationship with the first passages,
   wherein the outer casing defines a first flange proximate the second inlets and a second flange proximate the second outlets, each of the first flange and the second flange protruding toward the central axis to define an annular pool extending circumferentially all around the central axis, the first conduits located partially within the annular pool.

* * * * *